(12) United States Patent
Mashimo et al.

(10) Patent No.: US 6,904,009 B2
(45) Date of Patent: Jun. 7, 2005

(54) OPTICAL DISK APPARATUS

(75) Inventors: Akira Mashimo, Tokorozawa (JP); Toshihiro Ogawa, Iruma (JP)

(73) Assignee: TEAC Corporation, Musashino (JP)

(*) Notice: Subject to any disclaimer, the term of this patent is extended or adjusted under 35 U.S.C. 154(b) by 477 days.

(21) Appl. No.: 10/226,500

(22) Filed: Aug. 22, 2002

(65) Prior Publication Data

US 2003/0043711 A1 Mar. 6, 2003

(30) Foreign Application Priority Data

Aug. 23, 2001 (JP) ........................................ 2001-252444

(51) Int. Cl.$^7$ ................................................ G11B 7/00
(52) U.S. Cl. ................... 369/47.5; 369/47.52; 369/53.1; 369/59.1; 369/116
(58) Field of Search ............................ 369/47.1, 47.28, 369/47.3, 47.5, 47.51, 47.53, 47.55, 53.1, 53.11, 53.37, 59.1, 59.11, 59.14, 116

(56) References Cited

U.S. PATENT DOCUMENTS 5,398,227 A * 3/1995 Miyaoka et al. ............. 369/116
5,933,410 A * 8/1999 Nakane et al. ............. 369/275.3
6,760,287 B2 * 7/2004 Sato ........................ 369/47.53

FOREIGN PATENT DOCUMENTS

| JP | 10-106009 | 4/1998 |
| JP | 11296858 A | 10/1999 |
| JP | 2000-306241 | 11/2000 |

* cited by examiner

Primary Examiner—Muhammad Edun
(74) Attorney, Agent, or Firm—Christensen O'Connor Johnson Kindness PLLC

(57) ABSTRACT

An optical disk apparatus that records data on an optical disk whose linear velocity is not constant. The optical disk apparatus includes an optical pickup that irradiates a laser beam of a recording power on the optical disk, converts light reflected from the optical disk into an electric signal; a detector that detects a level of the reflected light signal; and a controller that controls a recording power such that the reflected light signal level matches a target value set according to the linear velocity. When adjusting the recording power such that the reflected light level matches the target value, the target value is not set to a constant level, but set in accordance with the linear velocity. Target values at different linear velocities differ and, with this configuration, an appropriate target value is set and an appropriate recording power corresponding to the linear velocity is obtained.

18 Claims, 8 Drawing Sheets

OPTICAL DISK APPARATUS

FIELD OF THE INVENTION

The present invention relates to an optical disk apparatus, particularly to an apparatus that records data on an optical disk having different linear velocities in a radius direction.

BACKGROUND OF THE INVENTION

In an optical disk apparatus such as a CD-R drive, a LD (laser diode) irradiates a recording power no less than a reproduction power on an optical disk to form pits thereon while a rotational velocity of the optical disk is controlled at a constant linear velocity (CLV), and data is thus recorded. To optimize the recording power, techniques such as OPC (Optimum Power Control) and ROPC (Running Optimum Power Control) are used. In OPC, the recording power is changed in a plurality of steps (15 steps, for example) to perform test writing on a predetermined position (a test area or a power control area) of the optical disk, test writing data is reproduced to select a recording power having the best reproduction quality ($\beta$ value, for example). The $\beta$ value is calculated by the formula: $\beta=(a-b)/(a+b)$ where 'a' is a peak value and 'b' is a bottom value of a reproduction RF signal envelope, and the $\beta$ value is regarded to be optimum when it is within a predetermined range (0.04 to 0.05, for example).

On the other hand, even if the recording power is optimized using OPC, there are cases where recording sensitivity scatters along an optical disk plane due to the influence of recording film characteristics on the optical disk plane, warping, or the like. An OPC technique only decides the optimum recording power in the predetermined position of the optical disk, and there is no guarantee that data can be recorded with the same quality at other positions. ROPC deals with such varied characteristics by sampling a reflected light quantity from the optical disk in forming pits with the recording power and performs feedback control to the recording power to bring the reflected light quantity to a constant value.

Although OPC and ROPC enable control of the recording power to record data in the case of CLV control, even if such control is directly executed high quality recording is not possible with constant angular velocity (CAV) control because the linear velocity changes in accordance with a radius position of the optical disk.

Japanese Patent Laid-Open Publication No. Hei 11-296858 describes an attempted solution wherein the recording power is changed in accordance with the linear velocity in CAV control. Specifically, the recording power is increased approximately proportional to clock frequency for recording, which corresponds to the linear velocity.

Further, Japanese Patent Laid-Open Publication No. Hei 10-106009 describes correction of optimum recording power value determined through OPC in accordance with the linear velocity. Specifically, a correction coefficient is found for every wobble signal frequency proportional to the linear velocity, and the optimum recording power decided by the OPC is multiplied by the correction coefficient that corresponds to the wobble signal frequency during recording to correct the recording power.

The foregoing gazette also describes that the recording power is controlled using CAV control to bring the reflected light quantity of the recording power to a constant value always.

However, even if the recording power is adjusted in consideration of the linear velocity, optimum recording is not necessarily performed due to the variation of characteristics along the optical disk plane, and thus control similar to ROPC is also required with CAV.

On the other hand, by controlling the recording power to maintain a constant power of reflected light, a sequential feedback control such as ROPC is made possible. However, in the Japanese Patent Laid-Open Publication No. Hei 10-106009, the recording power is only controlled such that a reflected light quantity level is brought to a predetermined constant value, which is not sufficient. In other words, because the linear velocity increases at an outer circumferential area, recording sensitivity is reduced, a greater recording power is required and the quantity of reflected light generally increases accordingly. Therefore, in forming pits similar to those in an inner circumference in the outer circumference having the greater linear velocity, the intensity of reflected light after the pits have been formed should increase with the increase of recording power in the outer circumference having the greater linear velocity. Then, if the reflected light intensity is controlled to maintain to the same level as that of the inner circumference, excessive laser power, also referred to as 'over baking' is caused.

FIG. 9 shows level changes of the intensity of the light reflected at the inner circumferential area and the outer circumferential area when forming pits using a laser of recording power. In the drawing, level B shows the intensity of recording power light reflected after formation of pits. In the technique described in the Japanese Patent Laid-Open Publication No. Hei 10-106009, because the recording power is controlled to bring level B to the constant level in the inner circumference and the outer circumference, under normal circumstances the laser power becomes excessive and forms excessive pits and the value of level B becomes smaller as shown by the chain line than a primary value shown by the solid line, where the value of level B in the outer circumferential area is supposed to be greater than that of the inner circumferential area as shown by the solid line (when the same pits are formed in the inner circumference and the outer circumference, the outer circumferential area has greater reflected light quantity for the recording power is greater). As a result, optimum waveform for data reproduction cannot be obtained.

SUMMARY OF THE INVENTION

The object of the present invention is to provide an apparatus capable of recording data by adjusting the recording power even in the case where the optical disk is driven at an unconstant linear velocity, that is a varying linear velocity.

The optical disk apparatus of the present invention includes means for driving an optical disk so as to vary the linear velocity in the radius direction; means for irradiating a laser beam of a recording power on the optical disk; means for converting laser light reflected by the optical disk into an electric signal; means for detecting the level of a reflected light signal; and means for controlling the recording power such that the reflected light signal level matches a target value set according to the linear velocity. When adjusting the recording power such that the reflected light level matches the target value, the target value is not set at a constant level, but is set in according to the linear velocity. Specifically, a target value at one linear velocity is different from a target value at another linear velocity. With this configuration, an appropriate target value can be set and a recording power an appropriate to the linear velocity can be obtained.

In one embodiment of the present invention, different target values are stored in a memory for every linear velocity, the target value corresponding to the linear velocity in a data recording position is read out from the memory, and thus controlling the recording power. The target value is set such that it increases as the linear velocity increases. The linear velocity in the data recording position can be detected by various methods. For example, is the value may be detected from frequency of wobble signal caused by a wobble track on the optical disk.

According to one embodiment of the present invention, the recording power is adjusted in accordance with the linear velocity. Specifically, in a case where an optimum recording power in a reference linear velocity is given, the optimum recording power is adjusted based on a ratio of linear velocity in the data recording position to the reference linear velocity. Next, the optimum recording power adjusted in accordance with the linear velocity is controlled such that its reflected light signal level becomes the target value set in accordance with the linear velocity.

Although the present invention can be understood more clearly by referring to the following description of a preferred embodiment, the scope of the present invention is not limited to the illustrative embodiment.

BRIEF DESCRIPTION OF THE DRAWINGS

A more complete understanding of the present invention and the advantages thereof is provided by the following description taken in conjunction with the accompanying drawings.

DETAILED DESCRIPTION OF THE PREFERRED EMBODIMENT

The preferred embodiment of the present invention will be described in the following with reference to the drawings.

Figure 1:
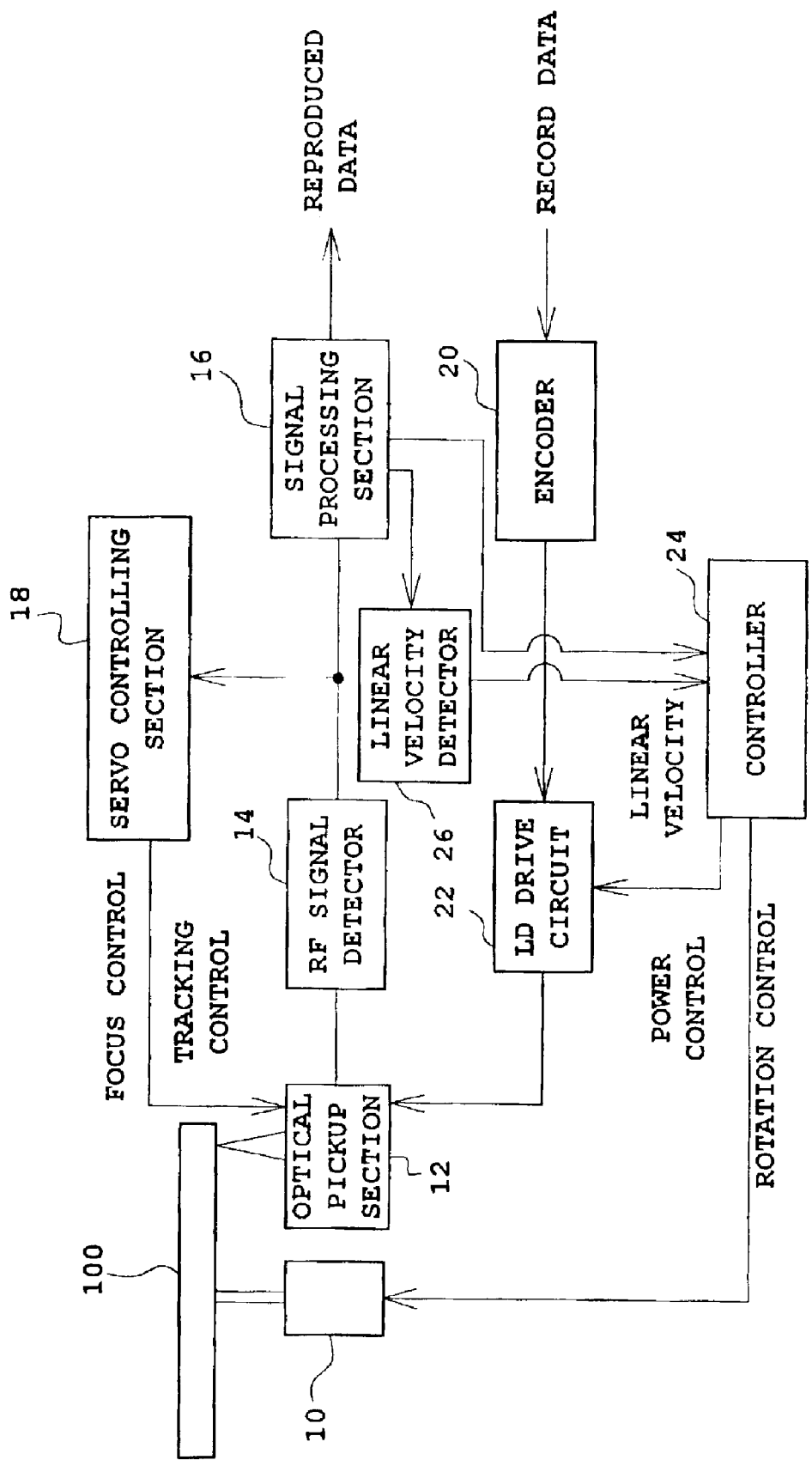
FIG. 1 is a configuration view of an optical disk apparatus.

FIG. 1 shows the configuration of an optical disk apparatus according to the present invention. An optical disk 100 is driven to rotate by a spindle motor 10. The spindle motor 10 drives the optical disk 100 to rotate based on a drive signal from a controller 24, and, in this embodiment, controls the optical disk 100 to maintain a constant angular velocity (CAV).

An optical pickup section 12 including an LD (laser diode), records data on the optical disk 100 by irradiating focused laser light (a laser beam) of a recording power, and reads out data recorded on the optical disk 100 by irradiating a laser beam of a reproduction power. When recording data, an encoder 20 encodes the record data (data to be recorded) and supplies the encoded record data to an LD drive circuit 22. The LD drive circuit 22 in turn supplies the drive signal to change the power of the LD. It should be noted that the LD drive circuit 22 uses the power of the LD as the reproduction power during a space period of the record data. A reproduction signal retrieved during a period at the reproduction power is used for extracting the wobble signal, tracking during recording, and focus control. A power optimized using OPC is used as the recording power, while ROPC is used to perform feedback control corresponding to the linear velocity. The control signal supplied from the controller 24 to the LD drive circuit 22 controls determination of recording power and feedback control for both OPC and ROPC.

The LD irradiates a laser beam of reproduction power during data reproduction. An RF signal detector 14 converts the reflected light into an RF signal and supplies this RF signal to a signal processing section 16. The signal processing section 16 comprises a filter, an equalizer, a binary circuit, a PLL circuit, and a decoder, and reproduces and outputs the data obtained from the RF signal. Further, it detects a peak value and a bottom value for calculating the β value from the reproduction RF signal during the OPC and supplies it to the controller 24. The signal processing section 16 also samples the reflected intensity of the light reflected during illumination of the recording power laser during ROPC and supplies this value to the controller 24. It should be noted that the RF signal is also supplied to a servo controlling section 18 and that the servo controlling section 18 generates a tracking error signal and a focusing error signal to control the tracking and the focusing position of the optical pickup section 12.

The controller 24 controls the spindle motor 10 to perform the CAV control, executes OPC and ROPC based on the signal quality that the signal processing section 16 has detected, and thus optimizes recording. In this embodiment, OPC is executed in the test area (PCA) provided in the inner circumferential area of the optical disk 100 at a plurality of linear velocities, and the optimum recording power and intensity of reflected light at each linear velocity are detected. Then, an initial recording power during recording is decided based on the obtained data, a target value of the reflected light quantity in ROPC is set based on the relationship of the intensity of the reflected light to linear velocity, and feedback control is performed on the recording power in order to obtain the variable target value.

The signal processing section 16 also comprises a wobble signal processing section that obtains an address on the optical disk 100 during recording by extracting the wobble signal from the RF signal and supplying the decoded wobble signal to a linear velocity detector 26.

The linear velocity detector 26 detects the linear velocity of the optical disk 100 during recording, and supplies the detected value to the controller 24. Specifically, the linear velocity detector 26 detects the frequency (center frequency) of the wobble signal and detects the linear velocity from the frequency. The controller 24 can detect the linear velocity, and the controller 24 therefore serves as the linear velocity detector 26 in this example.

Figure 2:
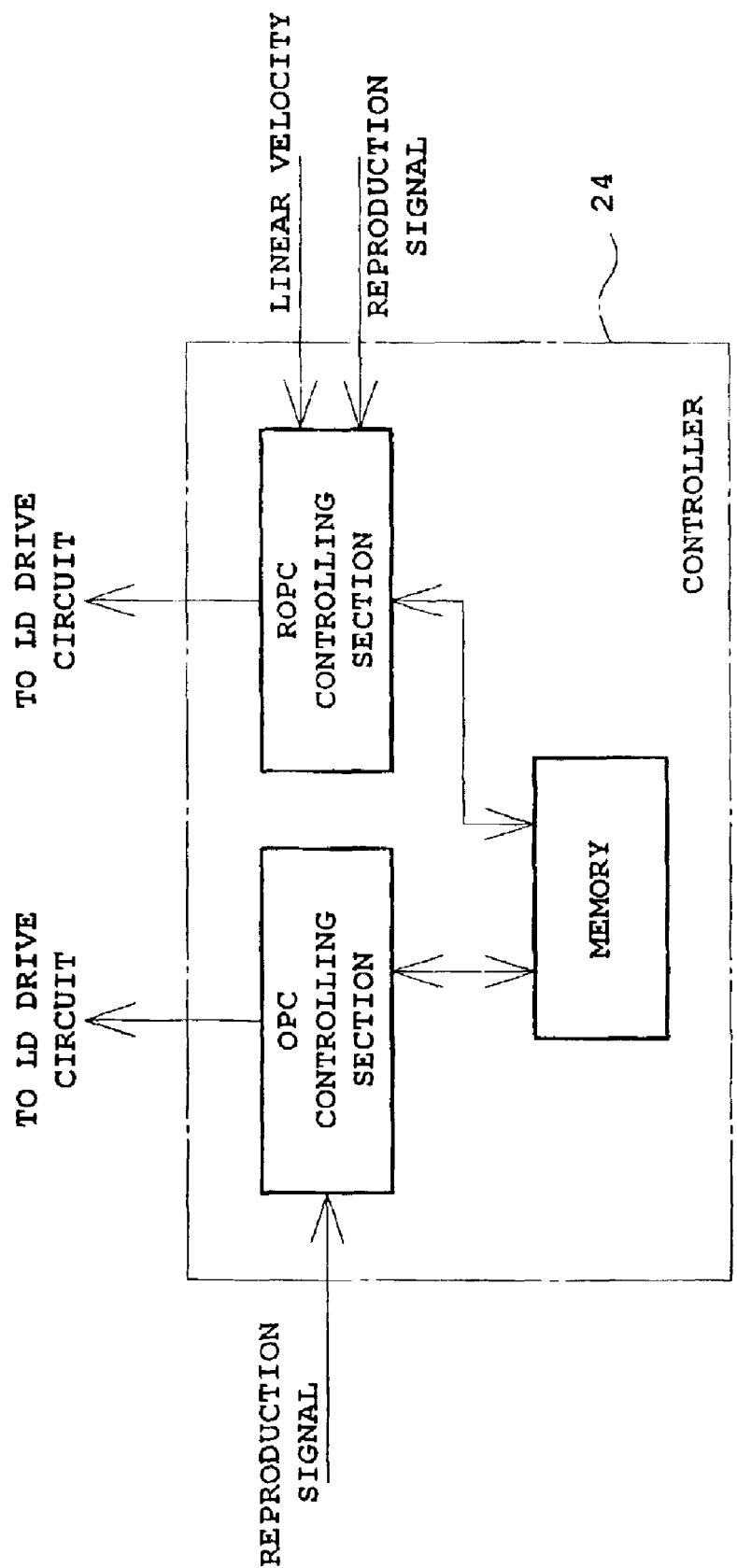
FIG. 2 is a functional block diagram of a controller in FIG. 1.

FIG. 2 shows a functional block of the controller 24 in FIG. 1. The controller 24 consists of a microcomputer, and has an OPC controlling section, an ROPC controlling section, and a memory.

Figure 3:
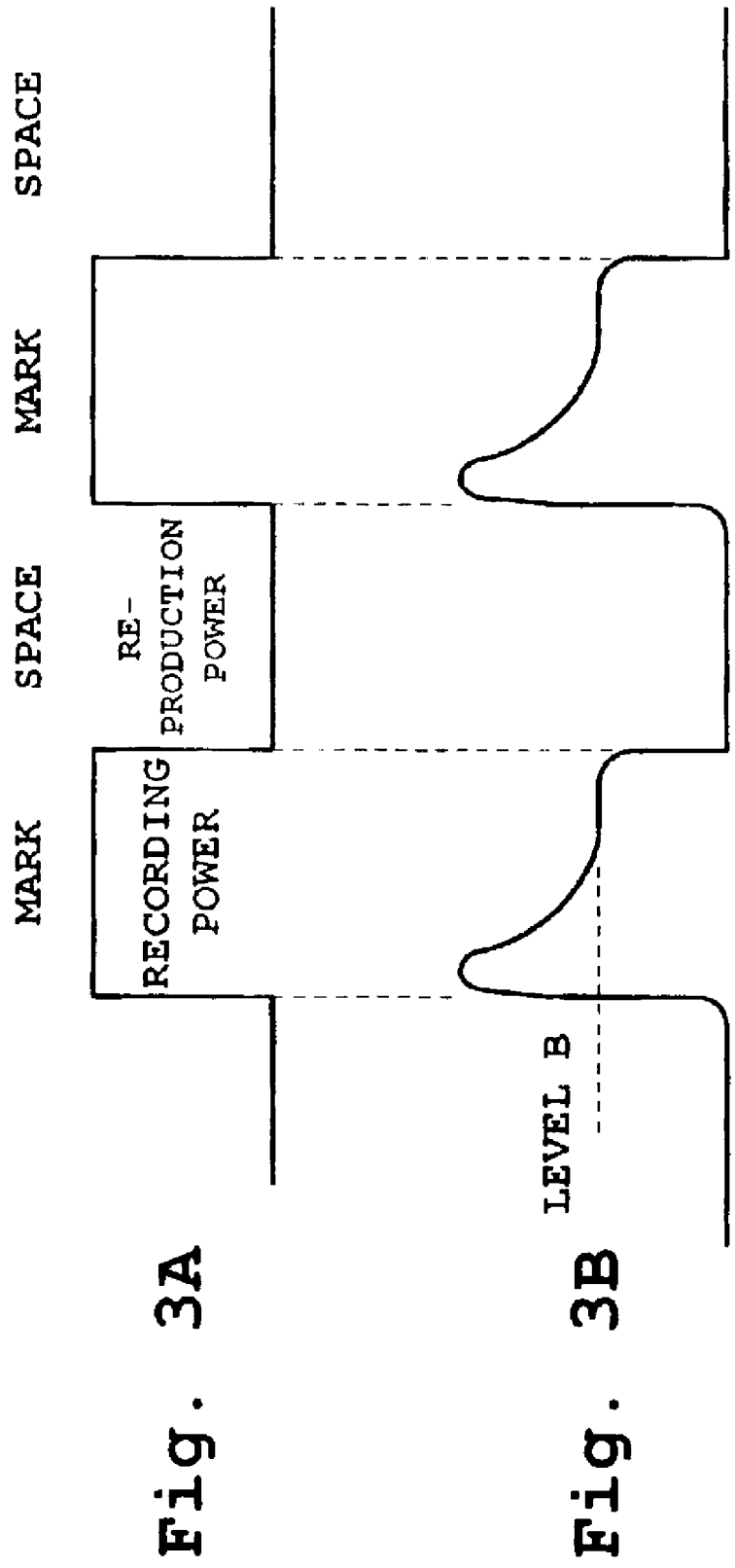
FIG. 3A is a record data waveform diagram.
FIG. 3B is a reflected light waveform exemplary view.

The OPC controlling section changes the recording power in 15 steps and calculates the β value at each recording power to decide the optimum recording power. The β value is calculated from the peak value and the bottom value of an envelope of the RF signal. Further, the OPC controlling section detects the reflected light quantity obtained during optimum recording power, which is level B, specifically. Level B is a light quantity of the recording power reflected by pit after the pit has been formed by irradiating the recording power. FIG. 3A and FIG. 3B show the timing chart of the recording signal and the timing chart of the reflected light quantity, respectively. The space period of the record data is the reproduction power. Because pits have not yet been formed in the initial period of the recording power, the intensity of reflected light increases suddenly by the amount of the recording power, then decreases due to interference by pits as pits begin to form, and eventually becomes a constant value B when pits are finally formed. Level B is decided proportional to the formula:

(recording power×pit section reflectivity).

Returning to FIG. 2, the OPC controlling section decides the optimum recording power and level B at each linear velocity. Specifically, OPC controlling section changes the rotation velocity of the optical disk 100 in 4 steps of 4× velocity, 6× velocity, 8× velocity, and 10× velocity; decides the optimum recording power and the value of level B at each velocity; and stores these values in the memory.

Table 1 shows an example of data stored in the memory.

TABLE 1

| 4× velocity | 6× velocity | 8× velocity | 10× velocity |
| --- | --- | --- | --- |
| P4 | P6 | P8 | P10 |
| B4 | B6 | B8 | B10 |

In Table 1, the optimum recording power and the value of level B in the case of 4× velocity, for example, are P4 and B4 respectively. Generally, P4<P6<P8<P10 and B4<B6<B8<B10.

On the other hand, the ROPC controlling section calculates a ratio between levels B at each linear velocity that the OPC controlling section has decided, and calculates the target value of level B at each linear velocity by the CAV control based on this ratio. Regarding this ratio, B10, which is the value of level B at 10× velocity, is used as a reference, and the ratio relative to the reference value is calculated. For example, the ratio with regard to 4× velocity is calculated by the formula: R1=B4/B10. Naturally, the ratio may be calculated by using the value of level B at 4× velocity as the reference.

Table 2 shows an example of a ratio stored in the memory.

TABLE 2

| 4× velocity | 6× velocity | 8× velocity | 10× velocity |
| --- | --- | --- | --- |
| R1 | R2 | R3 | P10 |
|  |  |  | B10 |

In Table 1, the ratio in the case of 6× velocity is (R2=B6/B10), for example. The ratio regarding 10× velocity is not described because it is 1. The 10× velocity is used as the reference velocity because the inner circumferential area corresponds to 10× velocity in the CAV control of 24× velocity, for example, and data can be recorded by directly using the optimum recording power and level B, which the OPC of 10× velocity has decided, when recording data in the inner circumference of the optical disk 100 having the CAV control of 24× velocity.

Figure 4:
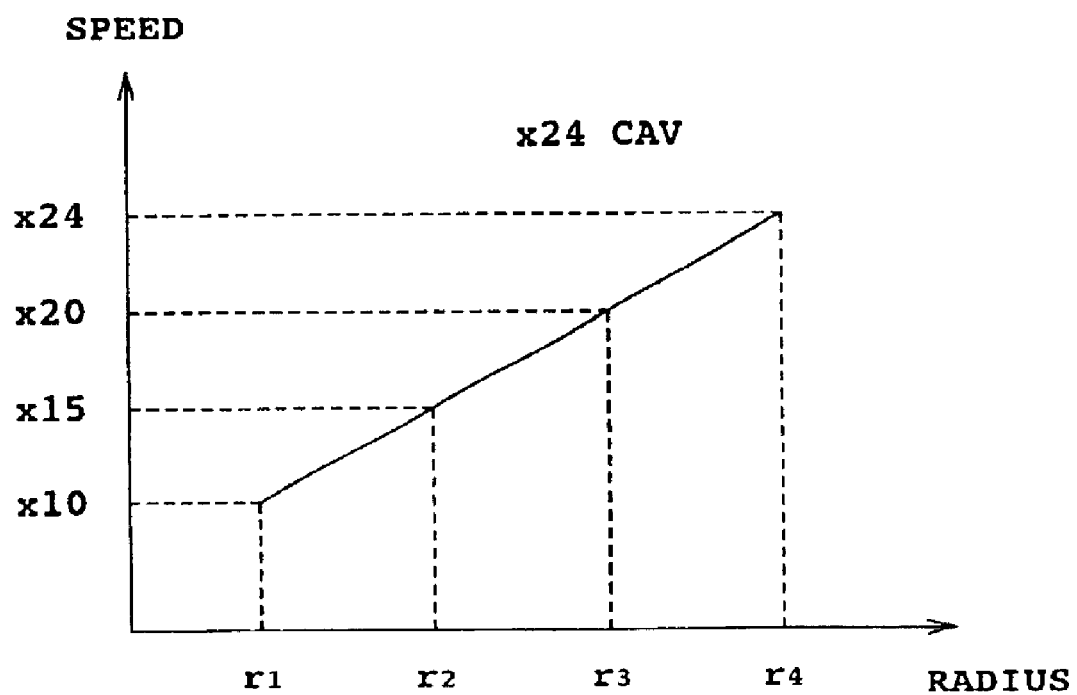
FIG. 4 is a graph showing the relation between a disk radius and a linear velocity.

Velocity ratios of 4× velocity, 6× velocity, 8× velocity, and 10× velocity in the OPC are 1.5 times for 6× velocity, 2 times for 8× velocity, and 2.5 times for 10× velocity, when 4× velocity is used as the reference, which substantially matches the ratio of velocity multiple, which are 15× velocity (1.5 times), 20× velocity (2 times) and 24× velocity (2.4 times), when recording begins at 10× velocity from the innermost circumference $r_1$ toward the outermost circumference $r_4$ in the CAV control as shown in FIG. 4. The ROPC controlling section assumes that the relation of level B at each velocity of 4× velocity, 6× velocity, 8× velocity and 10× velocity in OPC and the relation of levels B required in 10× velocity, 15× velocity, 20× velocity and 24× velocity in the CAV control are similar. Then, the ROPC controlling section corrects the target value of level B in the CAV control using the relation between linear velocity and level B in OPC, that is, the ratio described above.

The OPC controlling section and the ROPC controlling section can be realized by a single CPU.

In the following, recording power control processing in the controller 24 will be described in more detail.

Figure 5:
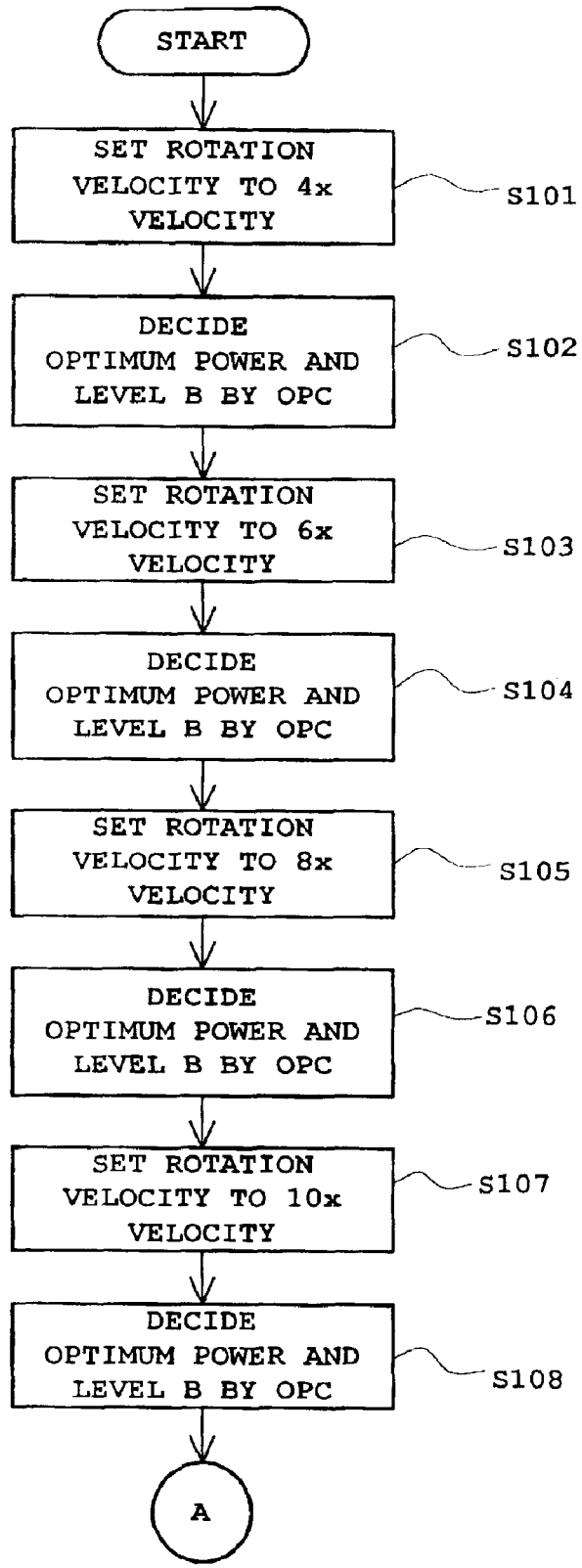
FIG. 5 is a processing flowchart (part 1).

FIG. 5 shows a processing flowchart when OPC is executed. First, the controller 24 sets the optical disk 100 to the rotation velocity that is 4× velocity in the test area of the inner circumference (S101), and determines the optimum power and level B (S102). Specifically, test data is recorded while the recording power is changed in 15 steps, each set of test data is reproduced to calculate the β values at every recording power, and the calculated values are stored in the memory. Then, the recording power with which a predetermined target β value is obtained is selected as the optimum recording power. Regarding the optimum recording power, the recording power having the β value closest to the target β value may be selected from among the 15 recording powers of 15, or the recording power where the target β value is obtained may be calculated by linear interpolation. After the optimum recording power has been selected, test data is recorded at the optimum recording power, and the value of level B during the test data recording is detected. The optimum power and level B obtained when recording is performed with the optimum power are set to P4 and B4 respectively.

Next, the controller 24 sets the optical disk 100 to the rotation velocity that is 6× velocity in the test area (S103), and decides the optimum power and level B at that time (S104). The optimum power and level B are set to P6 and B6 respectively.

Next, the controller 24 sets the optical disk 100 to the angular velocity that is 8× velocity in the test area (S105), and decides the optimum power and level B at that time (S106). The optimum power and level B are set to P8 and B8 respectively.

Finally, the controller 24 sets the optical disk 100 to the rotation velocity that is 10× velocity in the test area (S107), and decides the optimum power and level B at that time (S108). The optimum power and level B are set to P10 and B10 respectively. These optimum powers and levels B are stored in the memory in relation to every velocity multiple.

Figure 6:
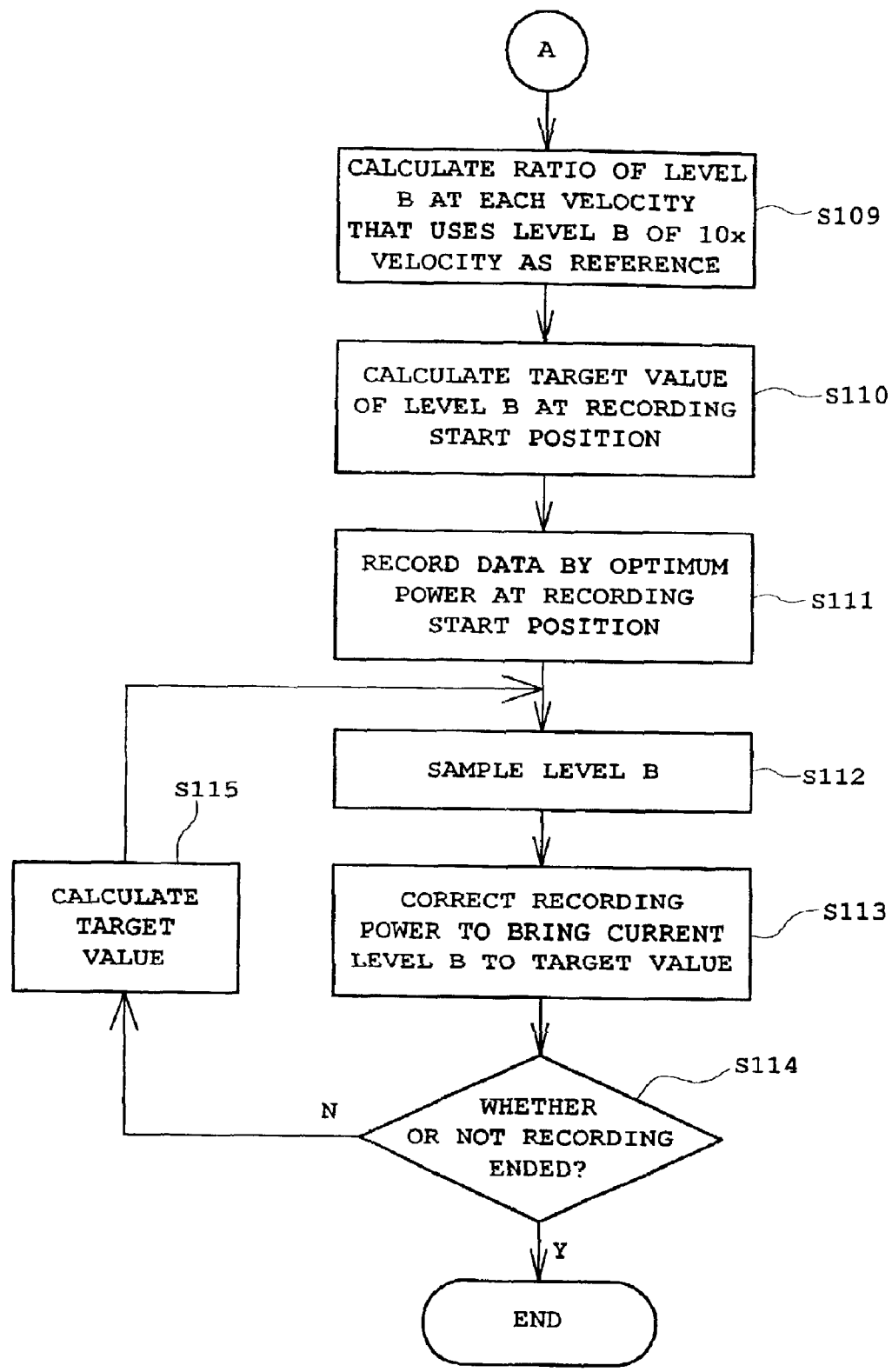
FIG. 6 is a processing flowchart (part 2).

FIG. 6 shows the ROPC processing flowchart during data recording using the optimum power and level B at each velocity multiple, as decided in the above-described processing. First, the controller 24, using the optimum power (P10) and the value of level B (B10) at 10× velocity, which are recorded in the memory, as the reference, calculates the ratio of level B at each velocity multiple (4× velocity, 6× velocity, 8× velocity)(S109). The ratio of level B at 4× velocity, the ratio of level B at 6× velocity, and the ratio of level B at 8× velocity become R1=B4/B10, R2=B6/B10 and R3=B8/B10, respectively. The ratio of level B at 10× velocity (R4) is 1. The calculated ratios are sequentially stored in the memory.

Next, by using the calculated ratio, the target value of level B at a recording start position of the optical disk 100 in the CAV control is calculated (S110). Specifically, in the case of the CAV of 24× velocity, the velocity changes from the innermost circumference toward the outermost circumference in 10× velocity, 15× velocity, 20× velocity and 24× velocity. Accordingly, the target value at each velocity multiple is calculated as follows when the value B of level B (B10) is used as the reference.

The target value at 15× velocity=B10×R2/R1
The target value at 20× velocity=B10×R3/R1
The target value at 24× velocity=B10×R4/R1

A predetermined interpolation processing (linear approximation) may be performed at a velocity multiples other than those noted above. Further, the linear velocity detected by the linear velocity detector 26 can be used as the velocity multiple value at the recording start position.

After calculating the target value at the recording start position, the controller 24 records data at the optimum power at the recording start position (S111). The optimum power can be decided in accordance with the linear velocity using the formula: P10×R6/P4, when the recording start position is at 15× velocity position, for example. Then, level B of reflected light quantity in the concerned recording power is sampled (S112) and the recording power is corrected so as to match the calculated target value (S113). Specifically, in the case where the value of level B when data has been recorded by the recording power is less than the target value at the recording position, it is determined that pits have been formed excessively and the recording power is reduced. On the contrary, in the case where the value of level B is greater than the target value at the recording position, it is determined that pits have not been formed sufficiently and the recording power is increased.

When recording data continuously, the controller 24 calculates the target value of level B at the recording position again (S115), and corrects the recording power so as to match the target value (S112, S113). In the target value calculation in S115, the reference value of level B (B10) may be corrected based on the disk position or the ratio at the linear velocity (velocity multiple) that the linear velocity detector 26 has detected, similar to the calculation in S110. The target value calculation processing in S115 may be appropriately thinned out depending on the processing capability of the controller 24.

As described above, in this embodiment, the recording power is corrected in consideration of the linear velocity in the CAV control and the control target value in the ROPC is corrected based on an ATIP (Absolute Time In Pre-groove), that is, according to the linear velocity. Thus, high-quality recording can be performed on the entire optical disk 100.

Figure 7:
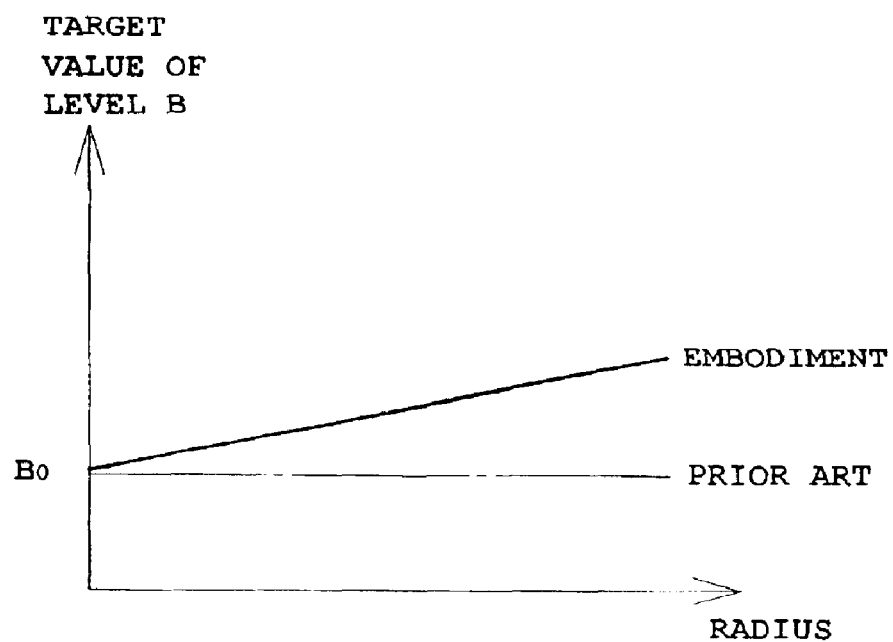
FIG. 7 is a graph showing the relation between the disk radius and a target value in CAV.

FIG. 7 schematically shows the target value of level B in this embodiment. It also shows a conventional target value in ROPC for comparison. In a conventional method, the target of level B is fixed to a predetermined constant value regardless of CLV control or CAV control. However, in this embodiment, the target value is changed in accordance with the disk radius (or ATIP or linear velocity) in CAV control.

Although description has been made using CAV control as an example in this embodiment, the present invention can be similarly applied along with ZCLV control in which the optical disk 100 is divided in several zones in the disk radius direction and CLV control is performed in each zone. Specifically, OPC is executed in a test area where the velocity multiple has a ratio that corresponds to the ratio of linear velocity in each zone, the optimum power and the value of level B in each velocity multiple are decided, and the ratio of level B is calculated. Next, the target value of level B in each zone may be calculated according to the ratio of level B.

Figure 8:
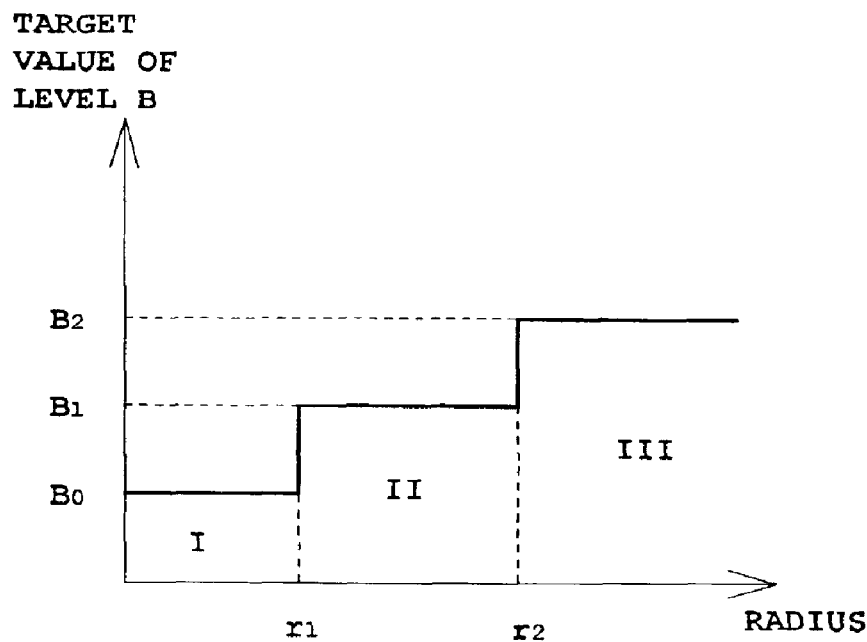
FIG. 8 is a graph showing the relation between the disk radius and a target value in ZCLV.
Figure 9:
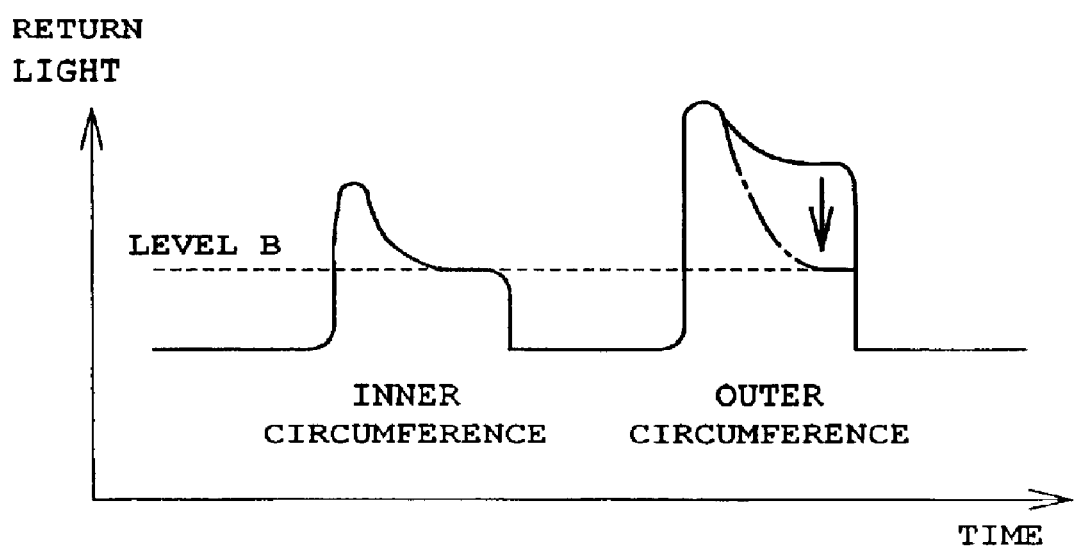
FIG. 9 is a reflected light waveform exemplary view in a related art.

FIG. 8 schematically shows the target values of level B in an example of ZCLV control having 3 zones of different linear velocities. Target value B0, target value B1, and target value B2 are set for zone I, zone II and zone III, respectively. The linear velocities are such that the velocity of zone I<II<III and the target values conform to B0<B1<B2.

Although an embodiment of the present invention has been described in the foregoing, the present invention is not limited to the example illustrating the embodiment but various kinds of modifications can be made. For example, although in the description of the preferred embodiment, the target value at the recording position is calculated in each case based on the noted ratio, the target values may be previously calculated for every radius position of the optical disk 100 or the ATIP and stored in the memory. When data is recorded, the target value corresponding to the disk radius at the recording position or the ATIP is read out from the memory, compared with the actual value of level B, and then used control the recording power. The target value for each linear velocity can be stored in the memory.

Further, although in the above embodiment the OPC is performed in 4× velocity, 6× velocity, 8× velocity and 10× velocity, and the target value of level B is calculated using the ratios of these levels B, the velocity multiple in OPC is not limited to 4 steps, but may be 2 steps, 3 steps, or 5 steps or more.

Furthermore, after the OPC has been executed at a velocity multiple and the optimum recording power and level B have been decided, the target value of level B at another velocity multiple may be calculated from the ratio of the linear velocities. Specifically, suppose the value of the reference level B at reference velocity multiple Vr is Br, the target value of level B at the recording position (velocity multiple V) can be calculated using the formula: $Br \times (V/Vr)^{1/2}$.

Still further, although in the above embodiment the linear velocity of the optical disk 100 is detected from the center frequency of wobble signal, it is also possible to use a timer or the like to measure an appearance time interval of decoded address information from the wobble signal, and to detected the linear velocity from the measured time interval.

What is claimed is:

1. An optical disk apparatus, comprising:

means for driving an optical disk so as to vary a linear velocity along a radius direction;

means for irradiating laser beam of a recording power on said optical disk;

means for converting light reflected from said optical disk into an electric signal;

means for detecting a level of a reflected light signal; and means for controlling said recording power such that said reflected light signal level matches a target value that is set in accordance with said linear velocity.

2. The optical disk apparatus according to claim 1, further comprising:

means for storing said target value for each of a plurality of said linear velocities, wherein said control means reads out a target value corresponding to a linear velocity at a data recording position from said storage means and controls said recording power.

3. The optical disk apparatus according to claim 1, further comprising:
   means for storing a reference reflected light signal level at a reference linear velocity; and
   means for operating said target value by correcting said reference reflected light signal level based on a ratio of linear velocity at a data recording position to said reference linear velocity,
   wherein said control means controls said recording power so as to match the target value calculated by said operation means.

4. The optical disk apparatus according to claim 3,
   wherein said operation means calculates said target value according to the following formula:

a target value=$Br(V/V_r)^{1/2}$ wherein V is a reference linear velocity;
   Vr is a linear velocity at a data recording position; and
   Br is a reference reflected light level.

5. The optical disk apparatus according to claim 1, further comprising:
   means for selecting an optimum recording power at each of a plurality of rotation velocities when the rotation velocity of said optical disk varies in predetermined regions of said optical disk;
   means for storing a reflected light signal level for each of the rotation velocities when data is recorded by the optimum recording power at each rotation velocity; and
   means for operating said target value by correcting a reference reflected light signal level based on the reflected light signal level for each rotation velocity,
   wherein said control means controls said recording power so as to match the target value calculated by said operation means.

6. The optical disk apparatus according to claim 5,
   wherein said operation means calculates said target value according to the following formula:

a target value=$Br \times Bn/Bm$ where Bn is a reflected light signal level at rotation velocity N;
   Bm is a reflected light signal level at rotation velocity M; and
   Br is a reference reflected light level.

7. The optical disk apparatus according to claim 5,
   wherein said operation means calculates said target value according to the following formula:

a target value=$Br \times Rn/Rm$ where Rn is a reflected light ratio of rotation velocity N to a reference rotation velocity;
   Rm is a reflected light ratio of rotation velocity M to a reference rotation velocity; and
   Br is a reference reflected light level.

8. The optical disk apparatus according to claim 1,
   wherein said driving means drives said optical disk at a constant angular velocity.

9. The optical disk apparatus according to claim 1,
   wherein said driving means drives said optical disk such that at a constant linear velocity is maintained in each of a plurality of zones.

10. An optical disk apparatus, comprising:
    means for driving an optical disk so as to vary a linear velocity along a radius direction;
    means for recording test data in a test area of said optical disk while a recording power is varied;
    means for reproducing said test data and detecting reproduction signal quality;
    means for selecting an optimum recording power based on said reproduction signal quality;
    means for detecting a linear velocity of said optical disk at a data recording position;
    means for correcting said optimum recording power in accordance with said linear velocity and recording data on said optical disk;
    means for converting light reflected from said optical disk during data recording into an electric signal;
    means for detecting a level of a reflected light signal; and
    means for controlling the recording power such that said reflected light signal level matches a target value that is set in accordance with said linear velocity.

11. The optical disk apparatus according to claim 10, further comprising:
    means for storing said target value for each of a plurality of linear velocities,
    wherein said control means reads out the target value corresponding to the linear velocity at the data recording position from said storage means and controls said recording power.

12. The optical disk apparatus according to claim 10, further comprising:
    means for storing a reference reflected light signal level at a reference linear velocity; and
    means for operating said target value by correcting said reference reflected light signal level based on a ratio of linear velocity at a data recording position to said reference linear velocity,
    wherein said control means controls said recording power so as to match the target value calculated by said operation means.

13. An optical disk apparatus, comprising:
    a spindle motor that drives an optical disk to rotate;
    an optical pickup that is capable of moving along a radius direction of said optical disk and which performs recording/reproduction of information by irradiating a laser beam on said optical disk;
    a servo control unit which drives said optical pickup along the radius direction of said optical disk and irradiates the laser beam irradiated from said optical pickup on a track of said optical disk;
    an RF signal detector which is connected to said optical pickup and which outputs information reproduced by said optical pickup as an RF signal;
    a signal processing unit which is connected to said RF signal detector and which decodes said RF signal to extract data and a wobble signal indicating wandering of said track from said RF signal to obtain address information from said wobble signal;
    a linear velocity detector which is connected to said signal processing unit and which detects a linear velocity of said optical disk from said wobble signal;
    an encoder which receives and modulates data to be recorded on said optical disk;
    a driver which is connected to said encoder and said optical pickup and which modulates a power of said laser beam based on said modulated data; and a controller which is connected to said driver, said signal processing unit, and said linear velocity detector, and which variably sets a target value in accordance with said linear velocity detected by said linear velocity detector and which, by comparing a reflected light intensity of recording laser beam from said signal processing unit with said target value, outputs to said driver a control signal which controls the power of said recording laser beam.

14. The optical disk apparatus according to claim 13, wherein said linear velocity detector detects said linear velocity based on a center frequency of said wobble signal.

15. The optical disk apparatus according to claim 13, wherein said linear velocity detector detects said linear velocity based on an appearance time interval of said address information obtained from said wobble signal.

16. The optical disk apparatus according to claim 13, wherein said controller performs setting such that said target value increases as said linear velocity increases.

17. The optical disk apparatus according to claim 13, wherein said controller sets said target value by correcting a reference target value in a reference linear velocity based on a ratio of said linear velocity to said reference linear velocity.

18. The optical disk apparatus according to claim 13, further comprising:

a memory which stores different target values for a plurality of linear velocities, wherein said controller reads out and sets as the target value the value corresponding to a linear velocity.

* * * * *